US006231083B1

(12) United States Patent
Marandi

(10) Patent No.: US 6,231,083 B1
(45) Date of Patent: May 15, 2001

(54) COUPLING ASSEMBLY FOR SELECTED ORIENTATION

(76) Inventor: Ali Marandi, 4482 Elm Tree La., Irvine, CA (US) 92715

( * ) Notice: Subject to any disclaimer, the term of this patent is extended or adjusted under 35 U.S.C. 154(b) by 0 days.

(21) Appl. No.: 09/415,256

(22) Filed: Oct. 12, 1999

(51) Int. Cl.$^7$ .................................................. B05B 15/00
(52) U.S. Cl. .................. 285/5; 285/360; 285/133.11; 285/125.1; 285/331
(58) Field of Search .............................. 285/5, 360, 331, 285/133.11, 125.1, 401, 579.1

(56) References Cited

U.S. PATENT DOCUMENTS

| | | | |
|---|---|---|---|
| 710,631 | * 10/1902 | Tietz | 285/360 |
| 1,945,760 | * 2/1934 | Strouf | 285/376 |
| 1,947,593 | * 2/1934 | Hamilton | 285/360 |
| 2,589,321 | * 3/1952 | Anderson | 285/5 |
| 3,734,545 | * 5/1973 | Stout | 285/5 |
| 4,171,095 | * 10/1979 | Filan et al. | 285/360 |
| 5,183,298 | 2/1993 | Harrington . | |
| 6,073,972 | * 6/2000 | rivera | 285/360 |

FOREIGN PATENT DOCUMENTS

| | | | |
|---|---|---|---|
| 367363 | * 3/1963 | (CH) | 285/360 |
| 387634 | * 2/1933 | (GB) | 285/360 |

* cited by examiner

Primary Examiner—Eric K Nicholson
(74) Attorney, Agent, or Firm—Boniard I. Brown

(57) ABSTRACT

Conduit coupling apparatus has a first conduit with an annular gasket in an outlet portion to receive a second conduit member sealingly and rotatably to retain the lugs on one member engaging flange portions on the other. Lateral conduits are securable about the outlet of the first member by flange portions secured by threaded fasteners, and quick-connect fittings are utilized.

15 Claims, 4 Drawing Sheets

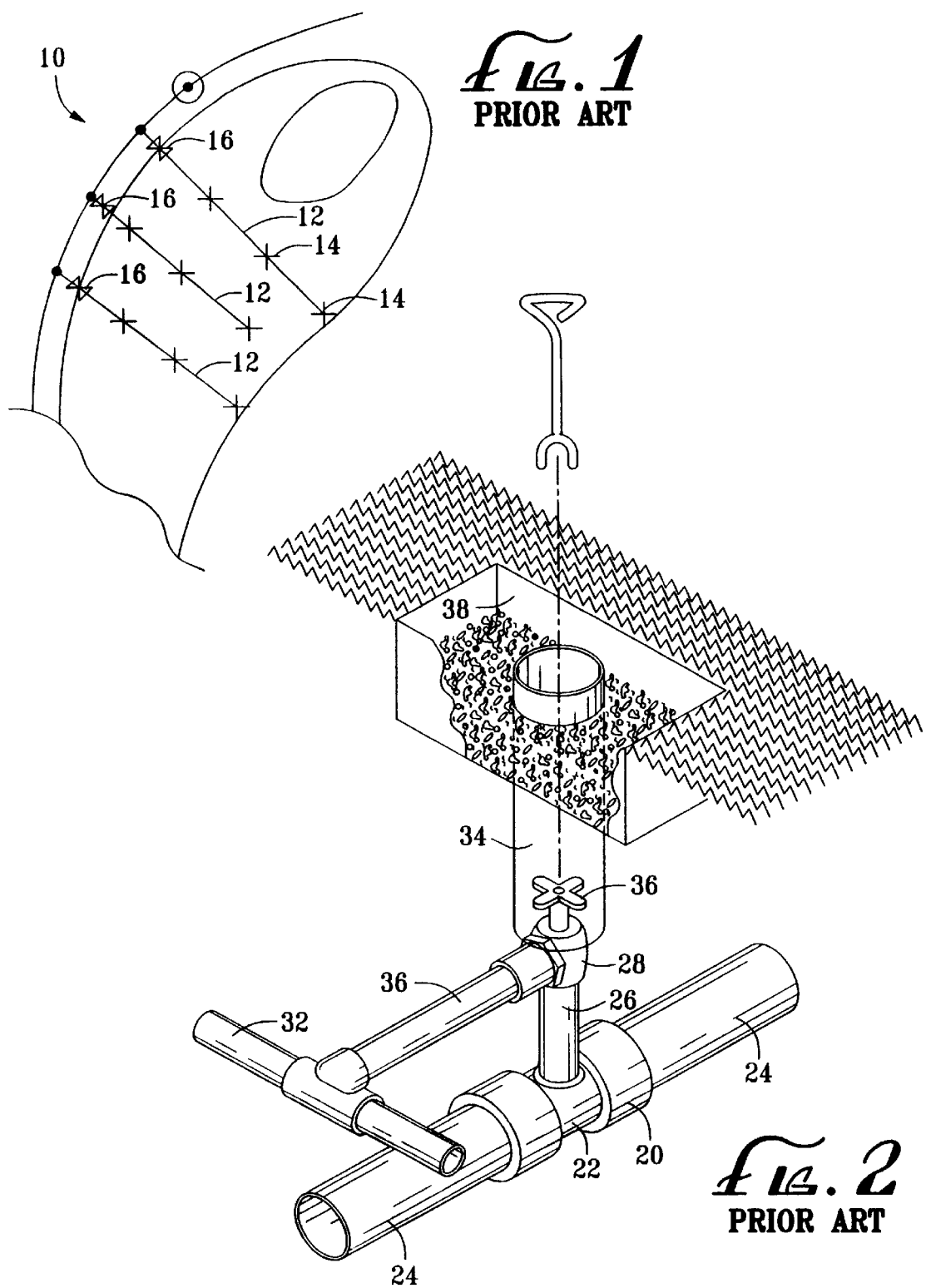

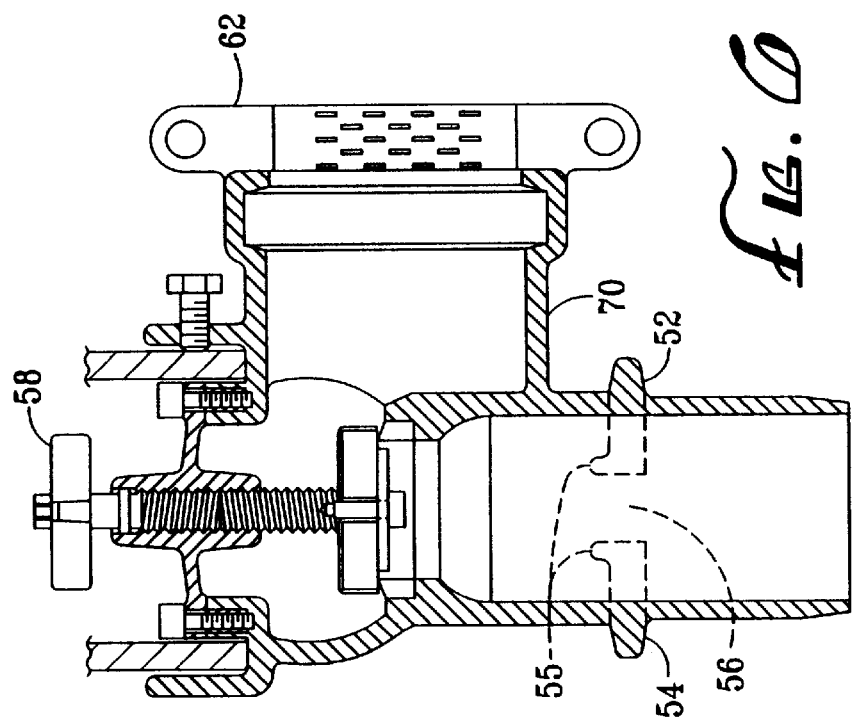
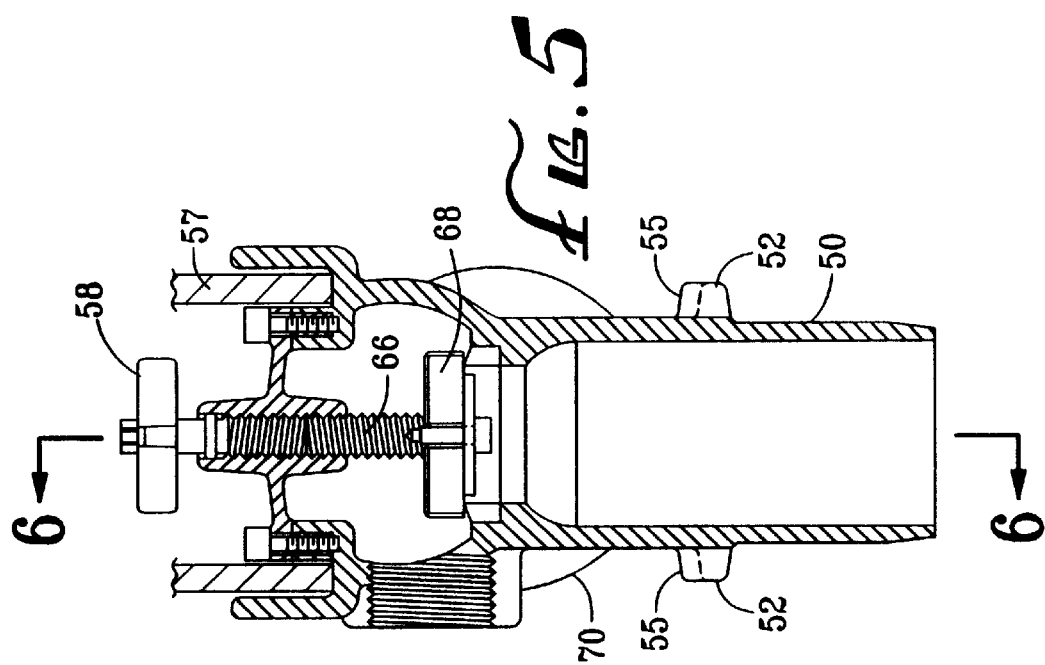

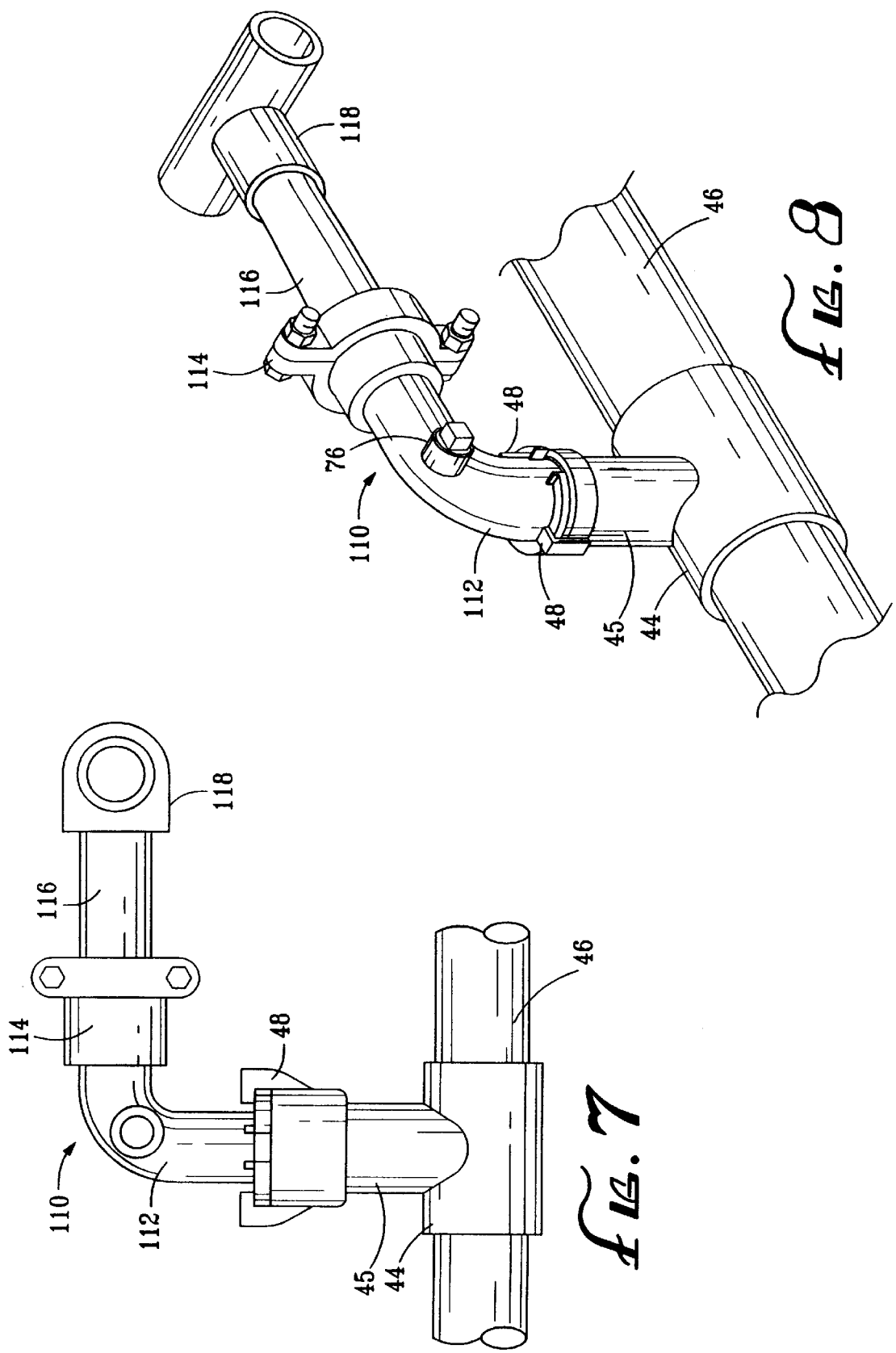

COUPLING ASSEMBLY FOR SELECTED ORIENTATION

BACKGROUND AND SUMMARY OF THE INVENTION

Irrigation systems for agriculture, golf courses, landscaping, etc., typically have one or more main lines and branching lateral lines. As generally indicated in FIG. 1, such a system 10 may have a main line, lateral lines 12, sprinklers 14 and isolation valves 16. FIG. 2 shows a prior art main line Tee connection and a lateral valve assembly. Lateral lines typically have or require various orientations relative to a main line.

Threaded connections are generally utilized between conduits, valves, etc. Glued joints are often utilized for ease of orienting lateral lines with main lines, etc. Such threaded or glued connections are troublesome, often lack strength, and involve excessive failures and problems. Accuracy of selected orientation of a lateral with a main line is difficult to achieve. Although FIG. 1 shows ideal orientation arrangements, such have been difficult to achieve in practice. Only limited relative angular rotation of a lateral line relative to main line can often be provided, and desired adequate orientation of laterals relative to main lines, etc., cannot be achieved without problems.

When successive joints are involved in an assembly or sequence of connections, later difficulties can be presented. Leveraging with "cheater bars" or other means, for tightening connections in desired orientations can result in cracked joints, broken nipples, etc. Backing off between threaded members by turning in the unsecuring direction can readily result in leakage, requiring such remedies as layers of tape, typically Teflon, in the effort to provide a desired relative conduit orientation. Some connections involve male adapters or threaded nipples of PVC plastic, and are subject to breakage, particularly in cantilever arrangements, where external loads are imposed, or where impacts are imposed by overhead traffic and the like.

In the prior art installation of FIG. 2, a valve tube 34 is disposed unsecured about a handle 36 of a valve 28, thus allowing debris to fill the tube about the valve handle, thereby rendering access to and the turning of the valve handle difficult or impossible.

The present invention addresses the foregoing and other prior art problems providing for accurate orientation and positioning of components into lateral lines relative to main lines, without threaded or glued connections. According to the invention, an annular resilient gasket is disposed in the outlet of a first tubular fitting, and a second tubular member and an end portion received in the resilient gasket and rotatable relative thereto for ease of relative orientation. Lugs extend from the first tubular member and engage flange portions on the second member to retain members against separation. The second tubular member may comprise a housing for a valve assembly for a conduit line extending laterally of a main line. The second tubular member may comprise or be connected with a 90° lateral conduit disposed in selected orientation relative to the first member.

BRIEF DESCRIPTION OF THE DRAWINGS

FIG. 1 is a schematic showing of main and lateral lines with valves and sprinklers for irrigating a portion of a golf course;

FIG. 2 illustrating a prior art assembly including a Tee connection between main and lateral lines, and a valve assembly;

FIG. 5 is a sectional view taken at line 5—5 in FIG. 3;

FIG. 6 is a sectional view taken at line 6—6 in FIG. 5;

FIG. 7 is an elevational view of an embodiment of the invention wherein a lateral conduit line having a 90° bend therein is rotatably mounted in the outlet of a Tee conduit; and FIG. 8 is a perspective view of the embodiment of FIG. 7.

DESCRIPTION OF THE PREFERRED EMBODIMENTS

Figure 3:
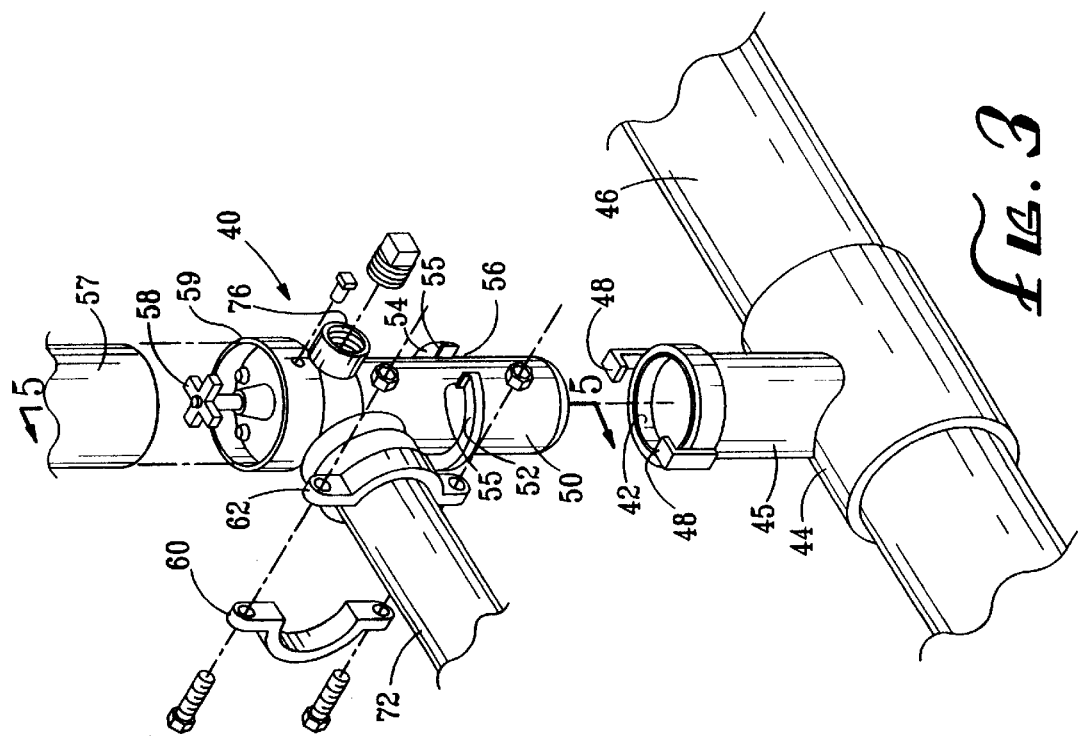
FIG. 3 is a perspective view of a preferred embodiment of the invention wherein are provided an improved connection between main and lateral lines, and an improved valve arrangement.

Referring to the drawings, an apparatus 40 according to the invention is shown in FIG. 3 as comprising a Tee connection 44 threadedably interconnected in a main line 46. A normally vertical connection 45 is disposed in an annular vertical outlet portion 45 wherein an annular sealing gasket 42 is mounted. Lugs 48 are disposed diametrically oppositely on the rim of portion 45 of the connection 45, and have lugs 48 extending upwardly and radially inwardly. The gasket-type outlet of the Tee connection enables rotation of a valve assembly for desired orientation.

A valve housing 50 is mounted in the gasket seal 42 and rotatable to any desired orientation. The valve housing 50 is received in the gasket outlet. Integrally cast flanges 52, 54 on the valve housing 50 define two diametrically opposite slots 56, one being hidden from view in FIG. 3, to allow entrance into the Tee connection member 45. End portions of flanges 52, 54 define upwardly extending shoulders 56, which prevent inadvertent disengagement from member 45 of the Tee connection 44.

The slots enable the disposition of the housing 50, with the slots allowing the two to be inserted past the lugs 48, after which the valve housing is rotated to its appropriate orientation.

A lateral line 72 is attached about an outlet opening of the valve 40 and is secured thereabout by clamp members 60, 62, as shown, the clamp section being secured by appropriate threaded fasteners, as shown.

An integrally threaded boss 76 is closable by a threaded plug 78 when not utilized.

A sleeve 57 extends about a valve handle 58 when received in a skirt or rim 59, to define a compartment for the valve handle, thus to prevent entry of debris into the compartment, which would make operation of the valve handle 58 difficult or impossible.

Figure 4:
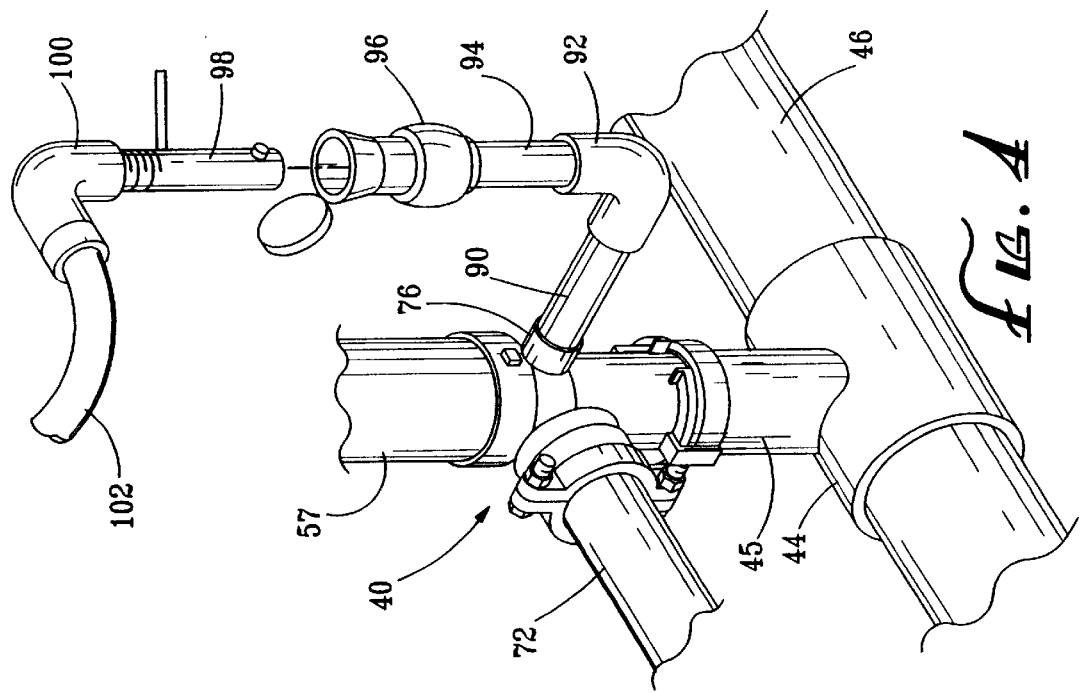
FIG. 4 is a perspective view of the embodiment of FIG. 3 together with an auxiliary outlet conduit attached to a nipple of the valve assembly.

FIG. 4 shows a pipe section 90 having an end portion threadedly secured in the boss 76, an elbow connection 92, a valve member 96 connected by connector 94, and a tubular member 98 for engagement in a valve 96. A bent elbow member 100 connects member 95 to a flexible hose 102, which may be utilized for manual watering of an area. Member 98 is received in a sealing gasket (not shown) in the valve member 96, and this is rotatable for orientation in a selected orientation.

FIG. 5, a sectional view taken in FIG. 3, shows a valve stem 66 and a valve closure member 68, in addition to the other components which are shown in FIG. 3.

FIG. 6, which is taken at line 6—6 in FIG. 5, shows details of connector structure 70 and a clamping components 62, which is an integrally cast half-clamp which cooperates with a separate half-clamp (not shown), the two being clamped together by threaded fasteners.

FIGS. 7 and 8 illustrate an embodiment 110 of the invention, wherein a 90° bend lateral elbow member 112 is secured by clamp rings 114 to a lateral Tee member 116 having an outlet portion at 118.

The fitting 112 is received in a swivel gasket connection wherein it is rotatable for selective orientation, and is retained by its flange end portion and the lugs 48.

It will be appreciated from the foregoing that the present invention requires no conventional threaded or grooved connections, and provides relatively easy relative angular adjustment of components for desired relative orientations. The invention is thus not limited by threaded connections which bind or otherwise often do not provide desired rotational adjustment and relative orientation.

It will be understood that various changes and modifications may be made from the preferred embodiments discussed above without departing from the scope of the present invention, which is established by the following claims and equivalents thereof.

What is claimed is:

1. Pipe coupling apparatus for a liquid conduit, comprising:
    first generally tubular member having an outlet end portion,
    an annular resilient gasket disposed in said outlet portion of said first tubular member,
    a second generally tubular member having a first end portion sized to be disposed within said resilient gasket in the first tubular member outlet portion for sealing engagement with and rotation relative thereto,
    said second tubular member being engaged with the first tubular member by a bayonet-type insertion of the second tubular member into the first tubular member,
    two diametrically oppositely positioned lugs extending upwardly and radially inwardly from the first end portion of the first tubular member, and
    flange portions spaced apart on the second tubular member and spaced from said first end portion thereof to enable the flange portion to pass the lugs of the first tubular member into engagement in said sealing gasket and to retain the first and second tubular members together by engagement of the flange portions with the lugs, whereby said second tubular member is rotatable to selected orientation relative to the first tubular member.

2. Apparatus according to claim 1, and further including:
    a lateral conduit member connected with and extending from an outwardly extending neck on a valve housing and secured thereabout.

3. Pipe coupling apparatus for a liquid conduit, comprising:
    a first generally tubular member having an outlet end portion,
    an annular resilient gasket disposed in said outlet portion of said first tubular member,
    a second generally tubular member having a first end portion sized to be disposed within said resilient gasket in the first tubular member outlet portion for sealing engagement with and rotation relative thereto,
    means on said first and second tubular members to retain the members against separation thereof, whereby said second tubular member is rotatable to selected orientation relative to the first tubular member, and
    a lateral outlet conduit to a lateral line is secured about an outlet opening of said second tubular member by clamp members secured together by threaded fasteners.

4. Apparatus according to claim 3, wherein one of said clamp members is integrally molded with said outlet neck.

5. A pipe coupling apparatus for liquid conduits, comprising:
    a first tubular member comprising a Tee connection mounted in an irrigation line,
    an annular resilient gasket disposed in said outlet portion of said first tubular member, and
    a second generally tubular member having an inlet end portion adapted for rotatable engagement with said sealing gasket, and
    said second tubular member comprising a housing for a valve connected with a liquid conduit line extending laterally of said main irrigation line,
    means on said first and second tubular members to retain the members against separation thereof,
    whereby said second tubular member is sealingly engaged with said first generally tubular member and is rotatable to a selective relative orientation relative to the first tubular member.

6. Apparatus according to claim 5, wherein:
    said second tubular member is engaged with said first tubular member by a bayonet-type insertion of said second member into said first member.

7. Apparatus according to claim 5, wherein:
    said means on the first and second tubular members to retain against separation thereof comprises:
        two diametrically oppositely positioned lugs extending upwardly and radially inwardly from the first end portion of the first member, and
        flange portions spaced apart on the second tubular member and spaced from said first end portion thereof to engage the flange portions to pass the lugs of the first tubular member into engagement in said sealing gasket and to retain the first and second members together by engagement of the flange portions with the lugs.

8. Apparatus according to claim 5, wherein:
    said second tubular member comprises a valve housing where a valve having a handle at an end portion of the housing opposite from its end portion engagable with said sealing gasket.

9. Apparatus according to claim 8, and further comprising:
    a lateral line conduit extending from an outwardly extending neck outlet on the valve housing and secured thereabout.

10. Apparatus according to claim 5, wherein:
    an outlet conduit to a lateral line is secured about an outlet opening of the first tubular member by clamp members secured together by threaded fasteners.

11. Apparatus according to claim 10, wherein one of said clamp members is integrally molded with said outlet neck.

12. Apparatus according to claim 8, and further comprising:
    an annular skirt extending about said valve handle, and
    a sleeve received in said skirt and extending therefrom,
    whereby debris is prevented from entering a region about said valve handle to maintain access to the valve handle by an appropriate tool.

13. Apparatus according to claim 7, and further comprising:
a threaded nipple extending outwardly from said valve housing to receive a threaded coupling to a liquid conduit.

14. Apparatus according to claim 13, wherein:
connected to said threaded nipple are a generally straight conduit, a right-elbow conduit, and quick-connect fittings for a flexible fluid conduit.

15. Pipe coupling apparatus for liquid conduits, comprising:
a first generally tubular member having an outlet end portion, said first tubular member comprising an outlet portion of a Tee connection mounted in a main irrigation line, an annular resilient sealing gasket disposed in said outlet portion of the first tubular member, a second tubular member having a first end portion sized to be disposed in said outlet portion and in said tubular sealing gasket and rotatable relative thereto, and means on the first and second tubular members to retain the members against separation thereof, and said second tubular member comprising a conduit extending laterally of said main irrigation line, said second tubular member having a 90° lateral liquid conduit connected with a liquid conduit extending laterally of said main irrigation line, and means on the first and second tubular members to retain the members against separation thereof, whereby said second tubular member and the 90° lateral conduit are disposable in selected orientation relative to the first Tee connection and selectively orientatable.

\* \* \* \* \*